US010675818B2

(12) United States Patent
Gallio

(10) Patent No.: US 10,675,818 B2
(45) Date of Patent: Jun. 9, 2020

(54) CENTERING TEMPLATE FOR DEVICES FOR APPLYING INSERTS ON LAMINAR SUPPORTS AND A DEVICE INCORPORATING THE SAME

(71) Applicant: A.M.F. S.p.A., Bassano Del Grappa (IT)

(72) Inventor: Paolo Gallio, Fara Vicentino (IT)

(73) Assignee: A.M.F. S.p.A., Bassano Del Grappa (VI) (IT)

( * ) Notice: Subject to any disclaimer, the term of this patent is extended or adjusted under 35 U.S.C. 154(b) by 0 days.

(21) Appl. No.: 16/214,782

(22) Filed: Dec. 10, 2018

(65) Prior Publication Data

US 2019/0176408 A1      Jun. 13, 2019

(30) Foreign Application Priority Data

Dec. 11, 2017   (IT) .................... 102017000142324

(51) Int. Cl.
*B29C 65/78*      (2006.01)
*B29C 65/00*      (2006.01)
(Continued)

(52) U.S. Cl.
CPC ............ *B29C 66/729* (2013.01); *A41D 27/08* (2013.01); *A41H 37/00* (2013.01); *A41H 43/00* (2013.01); *B29C 65/606* (2013.01); *B29C 66/4724* (2013.01); *B42D 15/0093* (2013.01); *B44C 1/18* (2013.01); *B44C 1/28* (2013.01);
(Continued)

(58) Field of Classification Search
CPC ......... B29C 65/78; B29C 65/48; B29C 65/56; D06Q 1/00; G09F 7/12; G09F 7/06
See application file for complete search history.

(56) References Cited

FOREIGN PATENT DOCUMENTS

EP      2151169 A1      2/2010
EP      2434471 A1      3/2012
(Continued)

OTHER PUBLICATIONS

Search Report and Written Opinion issued by Italian Patent Office in Italian application No. IT 201700142324, dated Aug. 3, 2018 (8 pages with pp. 6-8 in English).

*Primary Examiner* — Alexander S Thomas
(74) *Attorney, Agent, or Firm* — Jones Robb, P.L.L.C.

(57) ABSTRACT

The present disclosure relates to a template and a related method for the application of inserts in the form of letters, numbers or symbols on leather, fabrics, cloth, or similar laminar products to customize them. The centering template comprises a main support body (101) having a centering system (106) to allow an engagement of the template (100) in pre-fixed position to a base (3*a*) of a press (3); and a centering element (102) configured to receive in pre-fixed position at least a laminar portion (103) of an accessory (104). The centering element (102) has a through seat (105) for the inserts (11) and it is movable with respect to the main support body (101) between an extracted resting position in which an upper surface (102*a*) of the centering element (102) is moved away from the main support body (101) and a working position in which the upper surface (102*a*) of the centering element (102) is approached to the main support body (101). The template allows the correct positioning of the characters on the accessory both in terms of alignment, and in terms of distance from the edges and from the other inserts of the accessory (handles, buckles, etc. . . . ) and regardless of the shape assumed by the laminar portion itself.

20 Claims, 9 Drawing Sheets

(51) Int. Cl.
    *A41D 27/08*     (2006.01)
    *C14B 1/56*     (2006.01)
    *A41H 37/00*     (2006.01)
    *A41H 43/00*     (2006.01)
    *B44C 1/28*     (2006.01)
    *B44C 1/18*     (2006.01)
    *B29C 65/60*     (2006.01)
    *B42D 15/00*     (2006.01)
    *G09F 7/06*     (2006.01)
    *A41H 3/00*     (2006.01)
    *D06Q 1/00*     (2006.01)

(52) U.S. Cl.
    CPC .................. *C14B 1/56* (2013.01); *G09F 7/06*
        (2013.01); *A41H 3/00* (2013.01); *D06Q 1/00*
                                      (2013.01)

(56) References Cited

FOREIGN PATENT DOCUMENTS

| | | |
|---|---|---|
| EP | 3162954 A1 | 5/2017 |
| IT | 0001399834 | 6/2009 |

CENTERING TEMPLATE FOR DEVICES FOR APPLYING INSERTS ON LAMINAR SUPPORTS AND A DEVICE INCORPORATING THE SAME

TECHNICAL FIELD

The present disclosure relates to a template and a related method for applying inserts on laminar supports or portions. In more detail, the template and the method are intended to make it possible to apply inserts in the forms of letters, numbers or symbol on leathers, fabrics, cloth, or similar laminar products to customize the laminar portion itself.

BACKGROUND

As is well known, clothing or leather articles and fashion accessories are very often enhanced with decorative elements that reproduce trademarks, logos, inscriptions and/or images. In the sector of fashion, and not only in it, widespread use is made of the technique of fastening to the clothing item or, generally, to the fabric or leather, strings of alphanumeric characters representing words, trademarks, logos or more in general alphanumeric codes. Ever more frequently, these decorations become primary elements identifying a company or a given product, consequently assuming significant importance. In view of their commercial weight, the aforesaid decorative elements have been progressively refined over time, until assuming particularly elegant and prestigious configurations. In particular, in addition to the conventional printed customizations, raised decorations have been devised, formed by individual metal inserts that are appropriately applied on the product to be characterized. These alphanumeric codes typically consist of a set of letters, numbers and symbols made, depending on requirements, of metal and/or of a plastic material and they can be fixed to the fabric according to several known methods. If the string consists of a single rigid piece, these known methods can comprise fixing the entire string on the fabric in a single operation by known techniques, such as punching or riveting. This mounting method has, first of all, the drawback of locally depriving the fabric of its elasticity and flexibility where the string was fixed, inasmuch as the string is a rigid element, in any case less flexible than the fabric on which it is applied. An alternative to this mounting method consists of fixing a character at a time if the string is not in a single piece, so as to make the characters mutually independent. In this way, the fabric maintains substantially unaltered its elasticity and flexibility. However, this latter solution is not free of drawbacks, which include the fact that fixing a character at a time on the fabric entails long mounting times with the possibility of losing the alignment between one character and another. In an additional alternative, methods have become widely used which entail the engagement of an insert comprising multiple characters obtained with a single casting and then eliminating the sprues and risers after fastening to the fabric/leather. The described system does not allow to completely eliminate the burrs and machining residues which, consequently, end up considerably deteriorating the aesthetic value of each insert. To eliminate or at least reduce the drawbacks briefly identified above, the Applicant in the past developed a system to apply the inserts concurrently as described in the Italian patent no. IT 0001399834. According to this technique, a single support is made which removably bears the string of inserts to be applied to the fabric. The single support has a plurality of seats counter-shaped to the individual insert to be applied. In this way, the single support allows to maintain a perfect alignment of the alphanumeric string during application. Once the inserts are fastened, the support itself is removed and discarded, leaving a customized product with each insert perfectly aligned and finished, but separate from the others. The subsequent European patent EP2434471 describes a similar technique, whereby it is possible to apply a plurality of separate inserts to a support. The prior art techniques described, today widely used in the market, including high fashion and luxury accessories, can be further improved, particularly from the viewpoint of customization. The Applicant has observed that the characteristic of the customization of objects, in particular for fashion accessories and even more in particular for high fashion accessories, in recent years has become an ever greater demand on the part of users, who are also little inclined to wait a long time before receiving the customized accessory. In particular, a need has been observed on the part of customers to obtain customizations with alphabetic or numeric characters of fashion accessories already acquired previously and directly in the sale store. The idea of the support that bears the inserts allows perfect alignment of the characters and their optimal positioning without imperfections, but it limits the customization of the product, in the sense that it is necessary a priori to decide the string to apply, which then the support reproduces. This entails, on one hand, the need to apply the same strings on many products in order to reduce the costs of technology, and on the other hand the impossibility of a customization after the finished product is placed on sale, limiting in fact the customer's freedom to decide which characters/strings to be affixed, for example concurrently with the purchase of the item. From additional considerations made, the Applicant has also observed that perfectly aligning the characters is not sufficient to assure the successful outcome of the operation of applying the characters. To assure the optimal aesthetic appearance, not only must the characters be mutually aligned, but the applied characters must be correctly positioned on the accessory, not limitedly so as to be axially centered and/or not oriented, for example, obliquely. The great variety of accessories on which these characters can be positioned, each distinguished by its own shape, makes perfect application of the aforesaid characters not trivial, in particular when they are applied by personnel who have not been perfectly trained for the activity. In addition, it is important to stress that the application procedure entails holing the accessory, for example a handbag (often, a high-value item), which, in the case of unsuccessful operations, could entail significant economic damage in addition to the purchaser's lack of satisfaction.

SUMMARY

A purpose of the present disclosure is therefore to provide a device able substantially to solve the problems exhibited by the prior art, while maintaining the high quality level reached by the products on the market. A main purpose is to allow the correct positioning of the characters on the accessory, in particular on a laminar portion thereof, both in terms of alignment, and in terms of distance from the edges and from the other inserts of the accessory (handles, buckles, etc. . . . ) independently of the shape assumed by the laminar portion itself. In more detail, a purpose of the disclosure allows the correct positioning of the characters on the accessory regardless of the shape assumed by the laminar portion itself, so that this correct positioning can be reproducible on multiple accessories, regardless of the alphanumeric messages these characters bear. An additional purpose is to allow an advanced customization of the item which can even be decided a few minutes before making the alphanumeric string, for example concurrently with the purchase of the product. An additional purpose is also to allow both to decide the length of the string, i.e. the number of the inserts, but also its content, being able to satisfy these choices rapidly.

To achieve the aforesaid purposes and others besides, in accordance with a first aspect a centering template is obtained for devices for applying inserts (11) on laminar portions (103) comprising:
 a main support body (101) having a centering system (106) to allow an engagement of the template (100) in pre-fixed position to a base (3a) of a press (3);
 a centering element (102) configured to receive in pre-fixed position at least one laminar portion (103) of an accessory (104), said centering element (102) presenting a seat (105) for the inserts (11),
wherein the centering element (102) is movable with respect to the main support body (101) between an extracted resting position in which an upper surface (102a) of the centering element (102) is moved away from the main support body (101) and a working position in which the upper surface (102a) of the centering element (102) is approached to the main support body (101).

In accordance with a $2^{nd}$ non-limiting aspect, dependent on the $1^{st}$ aspect, or combinable with additional aspects, the centering element (102) provides at least a partial support for at least one laminar portion (103) through the upper surface (102a) which develops on a main extension plane; said centering element (102) being, moreover, configured to retain removably in the pre-fixed position said at least one laminar portion (103) of accessory (104), confining its movement with respect to the main extension plane and/or with respect to the upper surface (102a).

In accordance with a $3^{rd}$ non-limiting aspect, dependent on the $1^{st}$ and/or on the $2^{nd}$ aspect, or combinable with additional aspects, the upper surface (102a) of the centering element (102) identifies at least one planar sub-portion comprising a first axis (X) and a second axis (Y) orthogonal to the first axis (X).

In accordance with a $4^{th}$ non-limiting aspect, dependent on the $3^{rd}$ aspect, or combinable with additional aspects, the centering element (102) slides linearly between the resting position and the working position along a direction parallel to a third axis (Z) orthogonal to the first axis (X) and to the second axis (Y).

In accordance with a $5^{th}$ non-limiting aspect, dependent on one or more of the preceding aspects, or combinable with additional aspects, the template comprises at least one and optionally a plurality of elastic elements (113) interposed between the centering element (102) and said main support body (101), wherein the elastic element (113) is configured to push the centering element (102) in the resting position and to exercise a contrasting force to the movement of the centering element (102) from the resting position to the working position. Thanks to the presence of the elastic elements, the centering element (102) can be conveniently maintained in said resting position even when the laminar portion (103) of accessory (104) is positioned over it.

In accordance with a $6^{th}$ non-limiting aspect, dependent on the $5^{th}$ aspect, or combinable with additional aspects, said elastic elements (113) comprise a spring, for example of the helical type, having a first end introduced in a retention seat on said main support body (101).

In accordance with a $7^{th}$ non-limiting aspect, dependent on the $3^{rd}$ and $5^{th}$ and/or $6^{th}$ aspect, or combinable with additional aspects, the elastic element (113) is aligned along a transverse, optionally orthogonal direction with respect to the first axis (X) and to the second axis (Y). Thanks to this aspect, there is alignment between the direction of mobility of the centering element and the force exerted by the elastic element and this contribute to provide greater fluidity in the passage between the resting position and the working position.

In a non-limiting $8^{th}$ aspect, dependent on one or more of the previous aspects, or combinable with additional aspects, the resting position is a first limit position and the working position is a second limit position, and the centering element (102) can move between the resting position and the working position uninterruptedly, being able to assume a plurality of intermediate positions. The limit position therefore becomes a means for indicating the attainment of the application of the inserts on the laminar portion.

In accordance with a $9^{th}$ non-limiting aspect, dependent on the $5^{th}$ and on the $8^{th}$ aspect, or combinable with additional aspects, said working position and said plurality of intermediate positions are unstable positions by effect of the force exerted by the elastic element (113).

In accordance with a $10^{th}$ non-limiting aspect, dependent on the $5^{th}$ aspect and subsequent dependent or combined aspects, or combinable with additional aspects, the main support body (101) has a surface (101a) facing the centering element (102) having a predetermined number of housings to receive an end portion of a respective elastic element (113), a lower surface (102b) of the centering element (102) having a corresponding number of housings to receive the opposite end portion of the respective elastic element (113), said housings of the main support (101) and of the centering element (102) being in particular blind housings.

In accordance with an $11^{th}$ non-limiting aspect, dependent on one or more of the preceding aspects, or combinable with additional aspects, the centering element (102) comprises a containment portion (102q) emerging when moving away from the upper surface (102a) and defining an undercut identifying a profile retracing a first part of a perimeter of the laminar portion (103) of the accessory (104). Thanks to this aspect, in use the limitation of the movement of the laminar portion when positioned on the template is optimized in particular on the plane X-Y, and/or along the directions identified by the first axis X and by the second axis Y.

In particular, in accordance with a $12^{th}$ non-limiting aspect, dependent on the $11^{th}$ aspect, or combinable with additional aspects, the containment portion (102q) is defined at a perimetric region of the centering element (102).

More in particular, in accordance with a $13^{th}$ non-limiting aspect, dependent on the $12^{th}$ aspect, or combinable with additional aspects, the containment portion (102q) defines a substantially continuous perimetric edge extending exclusively in a front region of the centering element (102).

In accordance with a $14^{th}$ non-limiting aspect, dependent on the $13^{th}$ aspect, or combinable with additional aspects, the perimetric edge identifies a substantially orthogonal wall with respect to the upper surface (102a). The perimetric edge defines an effective abutment system for the definition of the correct positioning of the laminar portion before the actuation of the press.

In accordance with a $15^{th}$ non-limiting aspect, dependent on one or more of the preceding aspects, or combinable with additional aspects, the main support body (101) comprises a perimetric edge (109) defining an undercut (101q). Thanks to this aspect, one synergistically obtains both a guide for the introduction of the centering element (102) in the respective seat obtained on the main support body (101) and an additional abutment for the correct positioning of the laminar portion (103) on the template (100).

In a 16$^{th}$ non-limiting aspect, dependent on one or more of the preceding aspects, or combinable with additional aspects, the centering element (102) is substantially housed in the main support body (101). Thanks to this aspect, the relative position between the centering element and the main support body is better maintained especially with reference to any plays present on the plane X-Y, and this contributes to optimize the precision of application of the characters and the reproducibility of said application on multiple different accessories.

More in particular, in accordance with a 17$^{th}$ non-limiting aspect, dependent on the 16$^{th}$ aspect, or combinable with additional aspects, the centering element (102) is substantially housed in the main support body (101) at a front region of the main support body, and the perimetric edge (109) defines a sliding guide for the centering element (102) between the working position and the resting position.

In accordance with an 18$^{th}$ non-limiting aspect, dependent on the 11$^{th}$ and 15$^{th}$ aspects, or combinable with additional aspects, the containment portion (108) of the centering element (102) develops at the perimetric edge (109) of the main support body (101), the perimetric edge (109) and the containment portion (108) defining respective mutual sliding guides for the centering element (102) between the working position and the resting position.

In accordance with a 19$^{th}$ non-limiting aspect, dependent on one or more of the preceding aspects, or combinable with additional aspects, the seat (105) is a through seat with closed profile, in particular a through seat with substantially polygonal shape, for example rectangular.

In accordance with a 20$^{th}$ non-limiting aspect, dependent on one or more of the preceding aspects, or combinable with additional aspects, the main support body (101) comprises an auxiliary seat (111) for the inserts (11), the seat (105) of the centering element (102) and the auxiliary seat (111) being aligned along a third axis (Z).

In accordance with a 21$^{st}$ non-limiting aspect, dependent on the 20$^{th}$ aspect, or combinable with additional aspects, the alignment between the auxiliary seat (111) and the seat (105) is maintained at least both in the working position, and in the resting position of the centering element (102).

In accordance with a 22$^{nd}$ non-limiting aspect, dependent on one or more of the preceding aspects, or combinable with additional aspects, in the working position of the centering element (102) a lower surface (102b) of the centering element (102) abuts on an upper surface (101a) of the main support body (101).

In accordance with a 23$^{rd}$ non-limiting aspect, dependent on one or more of the preceding aspects, or combinable with additional aspects, the main support body (101) and the centering body (102) comprise respective through holes (111f) aligned along a third axis (Z), the main support body (101) and the centering body (102) being coupled to each other to maintain the alignment of the through holes both in the working position, and in the resting position of the centering body (103), In accordance with a 24$^{th}$ non-limiting aspect, dependent on the 23$^{rd}$ aspect, or combinable with additional aspects, the template further comprises an end stop element for each pair of through holes (111f), the end stop elements defining the resting position of the centering body (102) preventing a further move away of the upper surface (102a) of the centering element (102) from the main support body (101).

In accordance with a 25$^{th}$ non-limiting aspect, dependent on one or more of the preceding aspects, or combinable with additional aspects, the template is substantially symmetric with respect to a second median axis (Y) in the main plane of development of the template (100).

In accordance with a 26$^{th}$ aspect, dependent on one or more of the preceding aspects, or combinable with additional aspects, the main support body (101) comprises a perimetric edge (109) defining an undercut (101q), the perimetric edge (10) identifying a profile retracing a second part of the perimeter of the laminar portion (103) in a rear portion of the main support body (101).

In accordance with a 27$^{th}$ non-limiting aspect, dependent on one or more of the preceding aspects, or combinable with additional aspects, the main support body (101) comprises a recess substantially counter-shaped to the centering element (102) to receive the centering element (102) in the working position. Thanks to this aspect, the correctness of the relative positioning between the main support body and the centering element (102), specifically in the working position, is optimized.

In accordance with a 28$^{th}$ non-limiting aspect, dependent on one or more of the preceding aspects, or combinable with additional aspects, the centering element (102) comprises at least one fastening tab (108) positioned at a predefined elevation with respect to the upper surface (102a) of the centering element (102), at least partially overlapping the upper surface (102a) identifying with the upper surface (102a) a gap configured to limit the mobility of the laminar portion (103) of accessory (104).

In accordance with a 29$^{th}$ non-limiting aspect, dependent on the 28$^{th}$ aspect, or combinable with additional aspects, the fastening tab (108) has a thruster (107), movable along a direction substantially parallel to a third axis (Z), in which the thruster (107) comprises at least a first configuration of minimum distance with respect to the upper surface (102a) of the centering element (102) and a second configuration of maximum distance with respect to the upper surface (102a) of the centering element, the thruster (107) being positionable in a plurality of intermediate blocking positions between the minimum and the maximum distance to block the laminar portion.

In accordance with a 30$^{th}$ non-limiting aspect, dependent on the 29$^{th}$ aspect, or combinable with additional aspects, the fastening tab (108) is rigidly engaged to the centering element, optionally in a removable manner for example by means of fastening screws, and comprises an arm (106a) emerging cantilevered; the thruster (107) being movably fastened to the arm (106a).

In accordance with a 31$^{st}$ non-limiting aspect, dependent on the 29$^{th}$ or 30$^{th}$ aspect, or combinable with additional aspects, the thruster (107) has a threaded body, the fastening tab (108) comprises a counter-threaded hole configured to house the thread of the body of the thruster (107).

In accordance with a 32$^{nd}$ non-limiting aspect, dependent on the 28$^{th}$ aspect, or combinable with additional aspects, the fastening tab (108) is engaged to the containment portion (102q), optionally in a removable manner, for example by fastening screws.

In accordance with a 33$^{rd}$ non-limiting aspect, dependent on the preceding 32$^{nd}$ aspect, or combinable with additional aspects, two fastening tabs (108) are present, positioned on the centering element (102) in opposite positions with respect to a median axis of symmetry of the centering element.

In accordance with a 34$^{th}$ non-limiting aspect, dependent on one or more of the preceding aspects, or combinable with additional aspects, the centering element (106) comprises respective holes (106) or pins (106*r*) for a coupling to a separator element (110) fastened to the base (3*a*) of the press (3).

In accordance with a 35*th* non-limiting aspect, dependent on one or more of the preceding aspects, or combinable with additional aspects, the main support body (101) is installable on a separator element (110) configured to be set on the base (3*a*) of the press (3).

In accordance with a 36*th* non-limiting aspect, dependent on one or more of the preceding aspects, or combinable with additional aspects, the centering element (106) comprises holes (106) or pins (106*r*), obtained on the main support body (101), the separator element (110) having respective pins (106*r*) or holes (106) for a coupling to the centering system of the main support body (101).

In accordance with a 37*th* non-limiting aspect, dependent on one or more of the preceding aspects, or combinable with additional aspects, the main support body (101) and/or the centering element are obtained from wood-based fiber panels, for example made of MDF. Thanks to this aspect, one optimizes the cost and the manufacture of multiple shapes of main support bodies and/or centering elements in accordance with the various shapes which the laminar portion can assume.

In accordance with a 38*th* non-limiting aspect, dependent on one or more of the preceding aspects, or combinable with additional aspects, the main support body (101) and/or the centering element are at least partially coated superiorly with a finishing material, for example made of leather.

In accordance with a 39*th* non-limiting aspect, a device (1) is also obtained for applying inserts (11) on laminar supports (103), in particular on leather, fabrics, cloth, or similar products, comprising:
- a first support (2) for a press (3) having a fastening portion (4) configured to engage rigidly to a base (3*a*) of the press (3) and a housing portion (5) having a plurality of seats (6);
- a second support (7) for a press (3) having a respective auxiliary fastening portion (8) configured to engage to an element (3*b*) of the press (3) and an auxiliary housing portion (9) having a predetermined number of auxiliary seats (10), the first and the second support (2, 7) being relatively movable towards/away along a direction of displacement (21);
- a plurality of inserts (11) to be applied to the laminar portion (103);
- a plurality of retaining elements (12), each having an outer profile (12*a*) configured to be housed in a respective seat (6) of the housing portion (5) of the first support (2) and a respective receiving seat (13) to receive removably one of said inserts (11);
- a predetermined number of fastening elements (14) associable with said predetermined number of auxiliary seats (10) of the auxiliary housing portion (9) of the second auxiliary support (7) and configured to be fastened in use to the inserts (11);
- a centering template for devices for applying inserts (11) on laminar portions (103) according to one or more of the preceding aspects.

In accordance with a 40*th* non-limiting aspect, dependent on the 39*th* aspect, or combinable with additional aspects, the seat (105) for the inserts (11) houses in use said first support (2), and the centering element (102), in the passage between the resting position and the working position, slides with respect to the first support (2). Thanks to this aspect, an optimal coupling is obtained between the inserts and the centering element, so as to optimize the repeatability of the execution of application of the inserts on distinct laminar portions.

In accordance with a 41*st* non-limiting aspect, a method is also described for applying inserts (11) on a laminar portion (103), in particular comprising leather, fabrics, cloth, or similar products, comprising the following steps:
  a) positioning a laminar portion (103) on a press (3) for the application of inserts (11) on laminar portions (103), in particular on leather, fabrics, cloth, or similar products, comprising a centering template for devices for applying inserts (11) on laminar portions (103) according to one or more of the preceding aspects, wherein the positioning step, the laminar portion (103) is placed at least on the upper surface (102*a*) of the centering element (102);
  b) setting in relative motion a first support (2) of the press (3) with respect to a second support (7) of the press (3), following the movement the inserts (11) are transferred from a housing seat (13) of a plurality of retaining elements (12) of the press (3) to the laminar portion (103), wherein, through the relative motion between the first support (2) of the press (3) and the second support (7) of the press (3), the centering element (102) is moved relative to the main support body (101) between an extracted resting position in which the upper surface (102*a*) of the centering element (102) is moved away from the main support body (101) and the working position in which the upper surface (102*a*) of the centering element (102) is approached to the main support body (101).

In accordance with a 42*nd* non-limiting aspect, dependent on the preceding 41*st* aspect, or combinable with additional aspects, the method comprises a step of defining a composition or sequence of letters and/or alphanumeric characters on the laminar portion (103), followed by an installation of inserts (11) within a related support or housing portion (4; 5).

In accordance with a 43*rd* non-limiting aspect, dependent on the preceding 41*st* and/or 42*nd* aspect, or combinable with additional aspects, the method comprises a step of installing in said housing the sequence of inserts (11) in reverse order with respect to the reading order.

In a 44*th* non-limiting aspect, dependent on the 42*nd* or 43*rd* aspect, or combinable with additional aspects, the method comprises a step of engaging the housing portion 5 in a support portion 4.

In accordance with a 45*th* non-limiting aspect, dependent on one or more of the preceding aspects from the 41*st* to the 44*th*, or combinable with additional aspects, the method comprises a step of fastening the main support body (101) to a spacer element (110) positioned on a base (3*b*) of the press (3) by a coupling between holes and pins present on said spacer element (110) an/or on the main support body (101). Thanks to this aspect, a stable work base is obtained, in particular fixed to the press in a firm manner along the directions identified by the first axis and by the second axis.

In accordance with a 46*th* non-limiting aspect, dependent on the 45*th* aspect, or combinable with additional aspects, the fixing takes place by an axial alignment of the holes and pins, wherein the axial alignment optionally takes place along a third axis (Z).

In accordance with a 47*th* non-limiting aspect, dependent on the 45*th* or on the 46*th* aspect, or combinable with additional aspects, the main support body (101) is fixed to the spacer element (110) by a step of actuating screw locking elements (115, 116), optionally opposite, positioned between said main support body (101) and the spacer element (110).

In accordance with a 48$^{th}$ non-limiting aspect, dependent on one or more of the preceding aspects from the 41$^{st}$ to the 47$^{th}$, or combinable with additional aspects, the method comprises a step of introducing the inserts (11) and/or the housing portion (5) at the main support body (101), in an auxiliary seat (111) shaped at least partially to define a geometric shape corresponding to that of the inserts (11) and/or of the housing portion (5).

In a 49$^{th}$ non-limiting aspect, combinable with additional aspects, the method comprises a step of positioning the centering element (102) on the main support body 101, wherein in the positioning step the centering element (102) is approached axially to, optionally lowered towards, the main support body (101) along a direction substantially parallel to the one identified by a third axis (Z) orthogonal with respect to a first axis (X) and to a second axis (Y) defining a plane parallel to or coinciding with a plane along which develop maximally the main support body (101) and the centering element (102).

In accordance with a 50$^{th}$ non-limiting aspect, dependent on the 49$^{th}$ aspect, or combinable with additional aspects, the method comprises, before approaching the centering element (102) to the main support body (101), the execution of a step of preventively introducing elastic elements (113) in respective seats (112) present on the main support body (101).

In accordance with a 51$^{st}$ non-limiting aspect, dependent on the 49$^{th}$ and/or on the 50$^{th}$ aspect, or combinable with additional aspects, the centering element (102) is lowered in a recess (101k) counter-shaped to them and present on the main support body (101).

In accordance with a 52$^{nd}$ non-limiting aspect, dependent on the 50$^{th}$ and on the 51$^{st}$ aspect, or combinable with additional aspects, the centering element (102) is then lowered in a recess (101k) and it is made to rest on the elastic elements (113).

In accordance with a 53$^{rd}$ non-limiting aspect, dependent on the 52$^{nd}$ aspect, or combinable with additional aspects, when the centering element (102) is made to rest on the elastic elements (113), the upper end of said elastic elements (113) is introduced into blind counter-housings of the lower surface (102b) of the centering element (102).

In accordance with a 54$^{th}$ non-limiting aspect, combinable with one or more of the preceding aspects from the 41$^{st}$ onwards, and/or with additional aspects, the centering element (102) provides an at least partial support for at least one laminar portion (103) through the upper surface (102a) which develops on a main extension plan, and wherein in the positioning step, the laminar portion (103) is held removably in the pre-fixed position with confinement of the movement with respect to the main extension plane and/o with respect to the upper surface (102a).

In accordance with a 55$^{th}$ non-limiting aspect, a use is described of a centering template according to one or more of the preceding aspects, for applying inserts (11) on laminar portions (103) of accessories (104), in particular said accessories being clothing accessories such as handbags.

BRIEF DESCRIPTION OF THE DRAWINGS

The present invention shall be described in relation to some possible embodiments of a template associated with a device for applying inserts on laminar portions, in particular on leather, fabrics, cloth, or similar products, as shown and illustrated in the following exemplifying, and therefore non-limiting, figures, in which.

DETAILED DESCRIPTION

Figure 1:
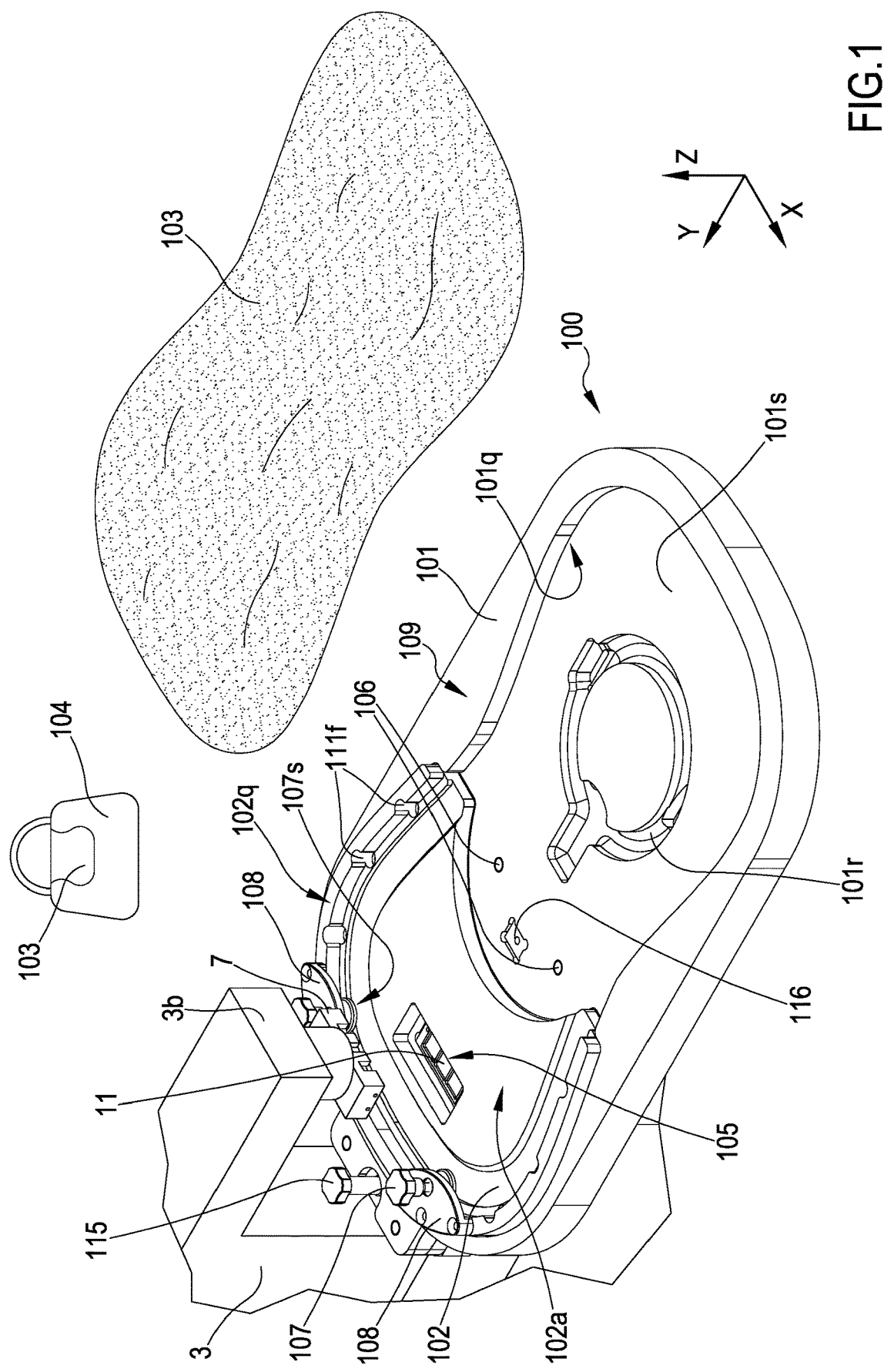
FIG. 1 is a perspective view of a template of the disclosure, in accordance with a first embodiment, installed on a press for the application of inserts on laminar portions of accessories.
Figure 2:
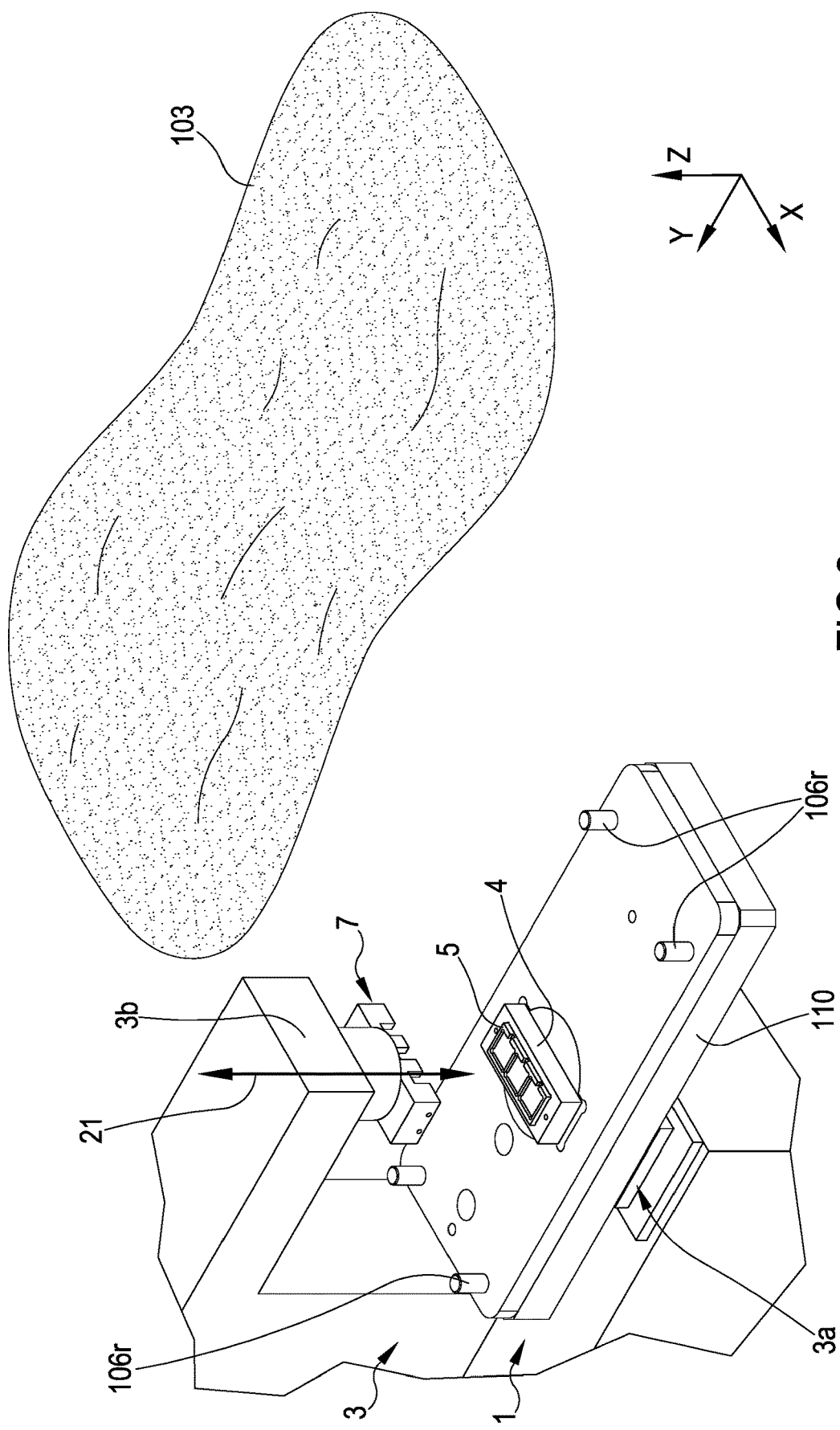
FIG. 2 shows a perspective view of the press, in which the template of the disclosure is removed from the press.
Figure 3:
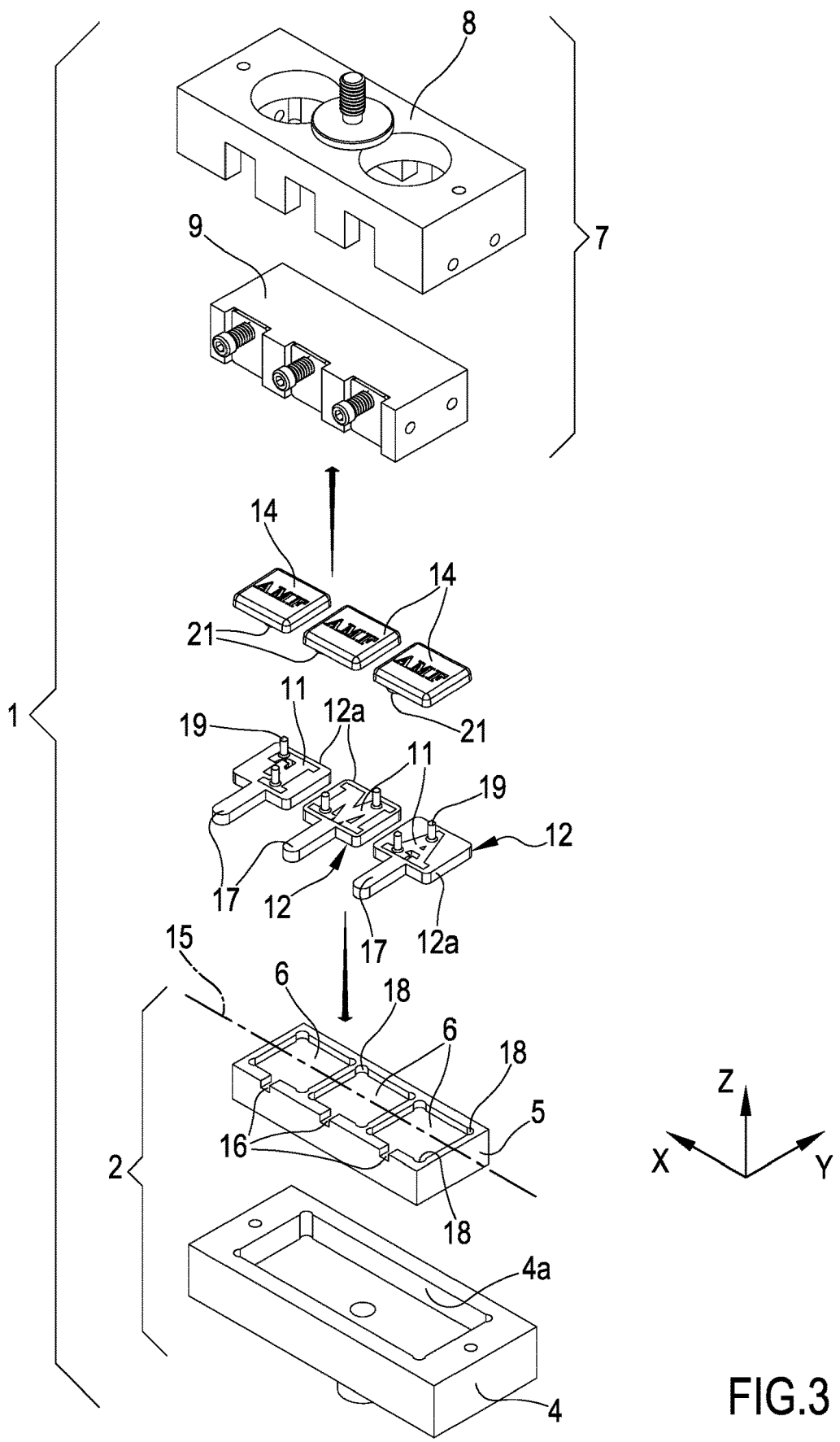
FIG. 3 shows a preferred and non-limiting configuration of a device for applying inserts to the laminar portion.

With reference to FIGS. 1, 2 and 3, the number 1 designates in its entirety a device for applying inserts 11 on laminar supports 103, in particular on leather, fabrics, cloth, or similar products. The laminar supports 103 are laminar portions of accessories 104, for example, and without limitation, of handbags.

The Press and the Device for Applying Inserts

As shown in FIGS. 1 and 2 the device exploits a press 3 (only schematically represented because it is of a conventional type) provided with a base 3a which bears a movable element 3b (or slide) that moves towards and away from the base of the press to allow imparting an appropriate pressure to the interposed elements and to allow the coupling of inserts and of respective counter-plates as specified and described in detail below. The device 1 is provided with a first support 2 inferiorly positioned and having a fastening portion 4 configured to be engaged fixedly to the base 3a of the press 3. The first support 2 also comprises a housing portion 5 having a plurality of seats 6. The illustrated embodiment (see also FIG. 3) shows the first support 2 consisting of two separate elements, the fastening portion 4 and the housing portion 5. In particular, the housing portion 5 of the first support 2 is removably engaged to the fastening portion 4 so that different housing portions 5 can be applied to the same fastening portion, replacing the one previously mounted for the purposes and the reasons specified below. In more detail, the fastening portion 4 has a main seat 4a positioned superiorly and intended to receive and hold in position the housing portion 5. The seat 4a has for example substantially rectangular shape, counter-shaped to the plan of the part of the housing portion that has to be inserted and coupled to the main seat 4a. The depth of the main seat is lower than the height or thickness of the housing portion 5 so that the latter projects superiorly with respect to the fastening portion 4. Obviously, additional systems may be provided to make integral the two portions 4 and 5 when in use, for example fastening dowels or screws or similar stable coupling systems. The presence of a main seat 4a allows a simpler and more immediate engagement of the housing portion selected in the working position (already calibrated)

so that it can be replaced with extreme ease with a different one according to the needs of the moment. However, it is evident that other fastening systems between the two portions could be equivalently adopted without departing from the scope of the invention. In addition, in a different embodiment (not illustrated), the two portions could be made of a single piece, i.e. consist of a same single body. It should be noted that the first support 2, and in detail the fastening portion 4, is engaged to the base 3a of the press 3 in a regulated manner, i.e. it is fastened and its relative position with respect to the base can be finely varied (calibrated) so that the various components of the device are perfectly aligned and the press can operate with extreme precision during the riveting operations to fasten the inserts 11. As shown in the accompanying figures, the housing portion 5 of the first support 2 comprises a plurality of seats 6 for example set side by side along a main direction 15. FIG. 3 shows the presence of 3 seats 6. Obviously, housing portions with more than three seats 6 can be provided, when necessary; substantially, portions 5 could be obtained with any number of seats (although not necessarily all aligned along the direction 15) according to requirements. In general terms, if the first support 2 consisted of two distinct elements, the coupling means between them would have to allow engaging the various housing portions 5 with different number and/or shape without touching the relative positioning of the fastening portion 4 with respect to the base 3a of the press 3 and without needing additional position calibrations. The first support 2 will in general be made of metallic material, although the possibility of using different materials is not excluded. Moving on to the examination of the seats 6, they are configured to receive a retaining element 12 each. Each retaining element 12 has an outer profile 12a (plan contour) configured to be housed in a single respective seat 6 of the housing portion 5 and it also has a respective housing seat 13, centrally positioned, to receive removably one of the inserts 11 to be coupled with the laminar portion 103. It should be noted that all the various seats 6 have the same external conformation able to receive the corresponding retaining elements which, in turn, have the same outer profile 12a. In this way, each seat 6 can indifferently receive any retaining element 12, i.e. taking any retaining element 12, it may be housed in the first, second or third seat 6 in a wholly arbitrary manner. As is understandable, the retaining elements 12 vary from each other substantially by the insert 11 they bear, or by the inner seat 13 that receives the insert 11 itself. This modularity therefore allows to position the inserts so as to form the desired alphanumeric string on the finished laminar product. In yet other words, having available a reasonable number of retaining elements with the related inserts, it is possible substantially to decide at the moment which combination thereof can be realized on the fabric/leather, simply by appropriately selecting them and positioning them in the related seats 6. Merely by way of example, having available the three retaining elements 12 of FIG. 3 bearing the inserts 11 "A", "M" and "F", it is possible to compose on the laminar portion 103 the inscriptions "AMF", "AFM", "FMA", "FAM", "MAF", "MFA"; this with only 3 inserts. As is understandable, having available a multitude of inserts (with very low cost) allows to obtain an advanced customization that can be decided at the moment. In this way a customer can, for example, purchase a fashion product/accessory and customize it with inserts at the time of purchase, choosing both the length, and the type of inscription or sequence to be applied. Returning to the geometry of the seats 6, the seats have polygonal external conformation, in particular with 4 main sides and still more in particular square. Obviously, the geometry of the seats 6 can be any shape that can be found most advantageous. At the union regions of the two contiguous sides of the profile is present a respective indentation 18 that facilitates the insertion/extraction operations of the retaining elements 12. Observing the lower detail of FIG. 3, it is possible to note that each of the seats 6 has open external profile conformation and presenting at least one passage 16 able to allow housing a corresponding projecting portion 17 of the retaining elements 12. The passage 16 is defined by a channel that is developed starting from the center of the housing portion 5 where the seat 6 is located until an exterior side of the housing portion 5. In fact the passage 16 allows housing the projecting portion 17 of the retaining element 12 emerging in the main development plane of the retaining element itself; the projecting portion is in the form of a tab configured to be partially housed in the passage 16 from the seat 6 and to project externally. The projecting portion allows easily to manipulate the retaining elements 12 and to extract them from the seat. As can be understood, not only are the seat 6 and the outer profile 12a of the retaining element 12 counter-shaped with respect to each other, but also the seats 6 have slightly smaller depth (for example one or more tenths) or substantially coinciding with the thickness of the retaining elements 12. IN other words, the retaining elements 12, once they are inserted in the respective seats 6, emerge slightly in the thickness to avoid 'marking' the laminar portion 103 during the punching step and emerge substantially in the traverse direction (tab 17) with respect to the direction of approach/removal 21 of the first and second support 2, 7. Moreover, the housing seats 13 of the retaining elements 12 have means for removably keep the inserts in position. In more detail, the retaining element must hold in a precise position the insert during all the steps of positioning it on the press 3, but at the same time allow a simple and effective removal of the support 12 from the insert 11 when the latter is applied to the laminar portion 103 of the accessory 104. The holding means can be, for example, undercuts, tapering of the lateral wall of the housing seats and/or of the inserts, mechanical interference between the housing seats and the inserts. Naturally, the removal of the insert must entail no excessive effort or damage to the insert. In the (non-limiting) illustrated embodiment, the housing seats 13 of the retaining elements 12 are through seats with undercuts at the two opposite main surfaces. From the viewpoint of the materials, the retaining elements will generally be made of plastic material and in particular it was found advantageous to make them of nylon. The inserts 11, as is understandable, may have any shape and may or may not be alphanumeric characters or symbols. Each insert 11 has one or more pegs 19 emerging from the main plane of the insert away from the first support 2 when positioned in the seats 6. Different inserts 11 have a different position of the peg(s) 19 with respect to the outer profile 12a of the retaining element 12 that bears them. The inserts 11 are made of metallic material, for example a metal alloy such as Zamac. Moving on to the description of the upper part of the device, still referring to FIG. 3, there is a second support 7 superiorly positioned and having an auxiliary fastening portion 8 configured to engage rigidly to a movable element 3b of the press 3. The second support 7 also comprises an auxiliary housing portion 9 having a pre-determined number of auxiliary seats 10. The illustrated embodiment shows the second support 7 consisting of two separate elements, the auxiliary fastening portion 8 and the auxiliary housing portion 9. In particular, the auxiliary housing portion 9 of the second support 7 is removably engaged to the auxiliary fastening portion 8 so that different auxiliary housing portions 9 can be applied to the same fastening portion, replacing the one previously mounted to be married with what is mounted at the first support 2. In general, but without limitation, the second support 7 is a superior support movable towards/away from the first support 2, which vice versa is fixed. The second support 7, too, is adjustable in its position with respect to the movable element of the press 3, in particular the device comprises appropriate auxiliary adjusting means (not shown) to configure/calibrate the second support 7 in a plurality of different stable relative positions with respect to the movable element 3b. In this case, too, once the position of the auxiliary fastening portion 8 is adjusted, its position is no longer changed when replacing the auxiliary housing portion 9 with a different one. Obviously, in an additional embodiment, the second support 7 could be made of a single piece, i.e. the auxiliary housing portion 9 is irremovably fixed to the auxiliary fastening portion, or the parts could be in a single body. At this point it should be mentioned that, differently from the seats 6, the predetermined number of auxiliary seats 10 of the auxiliary housing portion 9 can be a single seat 10 (this embodiment is not shown in the figures) or a plurality of auxiliary seats 10. The auxiliary seat 10 holds in position the fastening elements 14 (or the counter-plates) which, coupling with the inserts at the opposite side to the laminar portion 103 allow the stable fastening of the insert to the support itself. If a single seat 10 is present, some embodiment variants are possible. In a first variant, the auxiliary seat 10 directly receives a single counter-plate or fastening element 14. The latter will be of the appropriate size, i.e. if for example three inserts 11 are expected to be applied it will have such length as to be able to bear the seat or the seats 21 intended to receive the pegs 19 of all inserts for coupling following riveting. If each insert has two pegs 19 and three inserts are present, the individual fastening element 14 will have at least six seats 21 positioned at the aforementioned pegs 19 so as to be able to engage all of them. There may be three counter-plates (three fastening elements 14) that are engaged in three corresponding auxiliary seats 10 for example by light interference or by means of clips that hold the counter-plate in position. The counter-plates have blind seats 21 placed at the pegs 19 of the inserts. Alternatively, the fastening elements 14 may be of the type shown in FIG. 3, or provided with through seats 21 to receive the aforementioned pegs 19 and allow a simple riveting thereof; in this case, too, the counter-plates may be directly held in the auxiliary seats 10 of the auxiliary housing portion 9. Whatever the embodiment, in the case of individual fastening elements, it is important that they be interchangeable in the position and engagement with the auxiliary seats 10 of the auxiliary housing portion 9. If the engagement is direct, they will have to have identical outer profiles, adapted to be coupled to each (any) of the auxiliary seats 10 (also identical to each other). If a support body 20 is used for each fastening element, then the fastening elements themselves may have identical or non-identical profile, but the various support bodies 20 will have to have identical outer profile, counter-shaped to the auxiliary seats 10 to be able to be positioned in the most appropriate location. Moreover, in case of fastening elements 14, one for each insert 11 to be applied, the number of the seats 6 of the first support 2 will have to be equal to the number of the auxiliary seats 10 of the second support 7, and the two supports 2, 7 precisely aligned so that the inserts 11 and the respective fastening elements 14 are aligned to assure their mutual engagement. Although the figures always show the first support 2 in lower position and fastened to the fixed base of the press and the second support 7 in upper position and fastened to the movable part of the press, it should be noted that the supports could be clearly reversed in their position, i.e. the first support 2 bearing the inserts 11 be positioned superiorly coupled to the movable element and the second support positioned inferiorly; moreover, only the lower part of the press bearing the first support may be movable, or both the upper and lower parts may be movable, i.e. the first and the second support in relative approach to each other. Obviously, the use of plastic or non-plastic materials is possible with regard to each of the components and of the related counterparts described. Moreover, it is essential to point out that the template of the present disclosure can be used with devices for applying inserts that are different from what is described in detail above, or also with devices of the type in accordance with the prior art and previously described. For example, the template can advantageously and equally be used for applying inserts with predefined and non-modifiable inscriptions, exploiting the technologies described in the patents IT0001399834 or EP2434471.

The Centering Template

Figure 4:
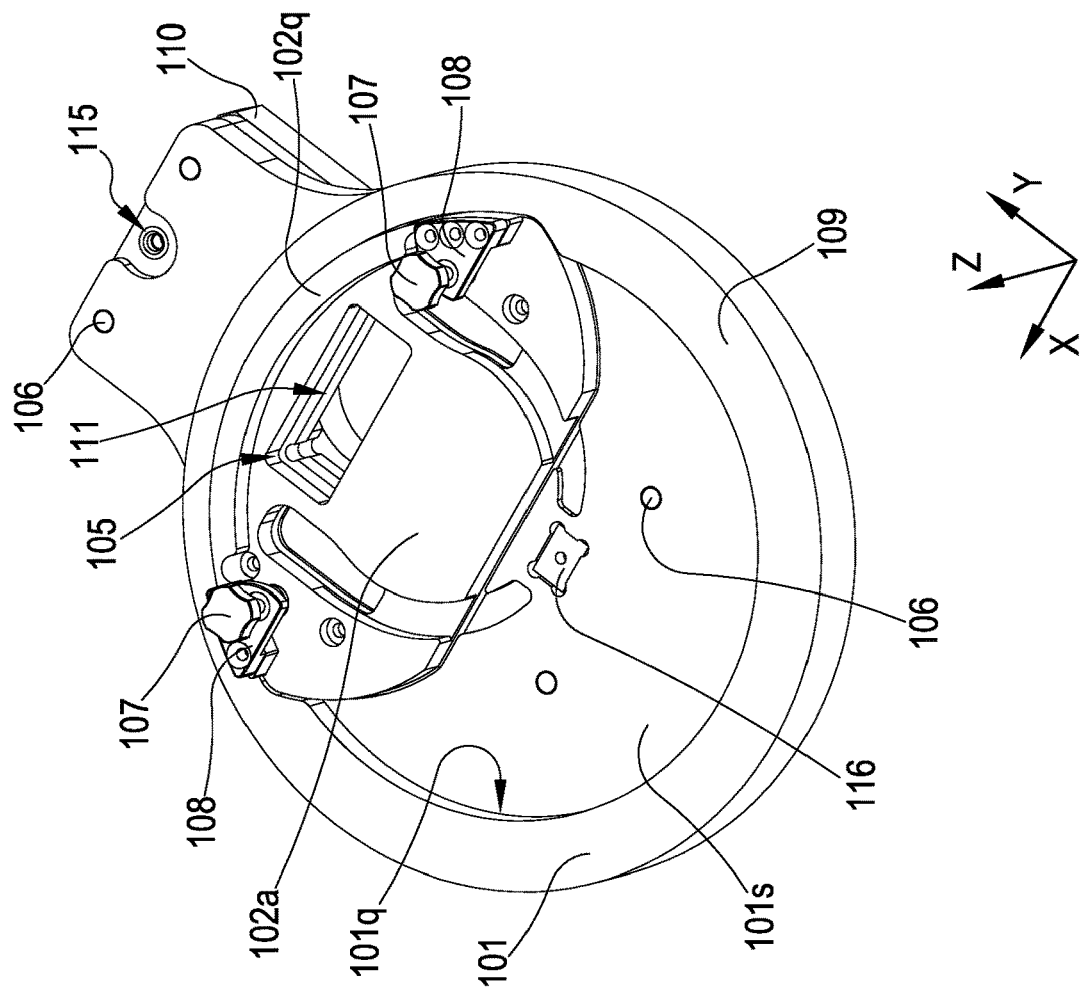
FIG. 4 is a perspective view of a template, in accordance with a second embodiment.
Figure 4:
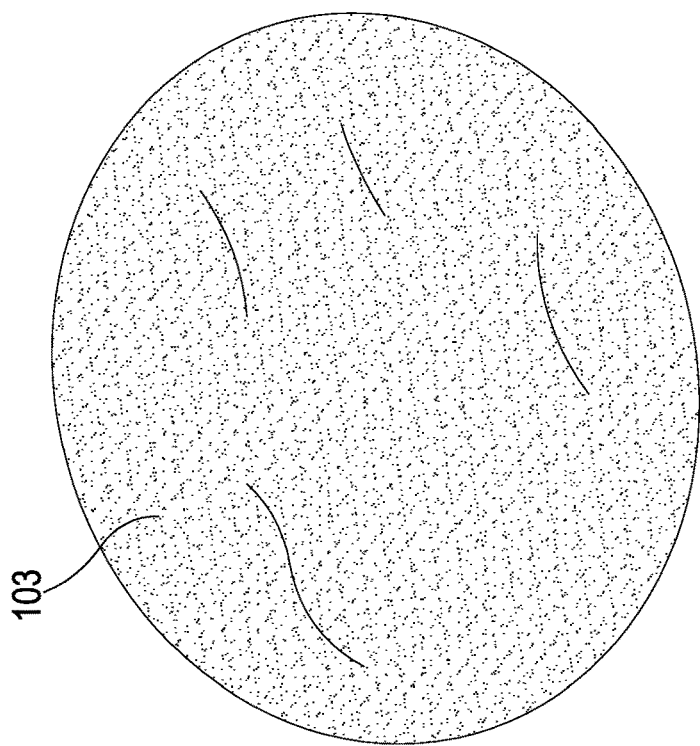
Figure 5:
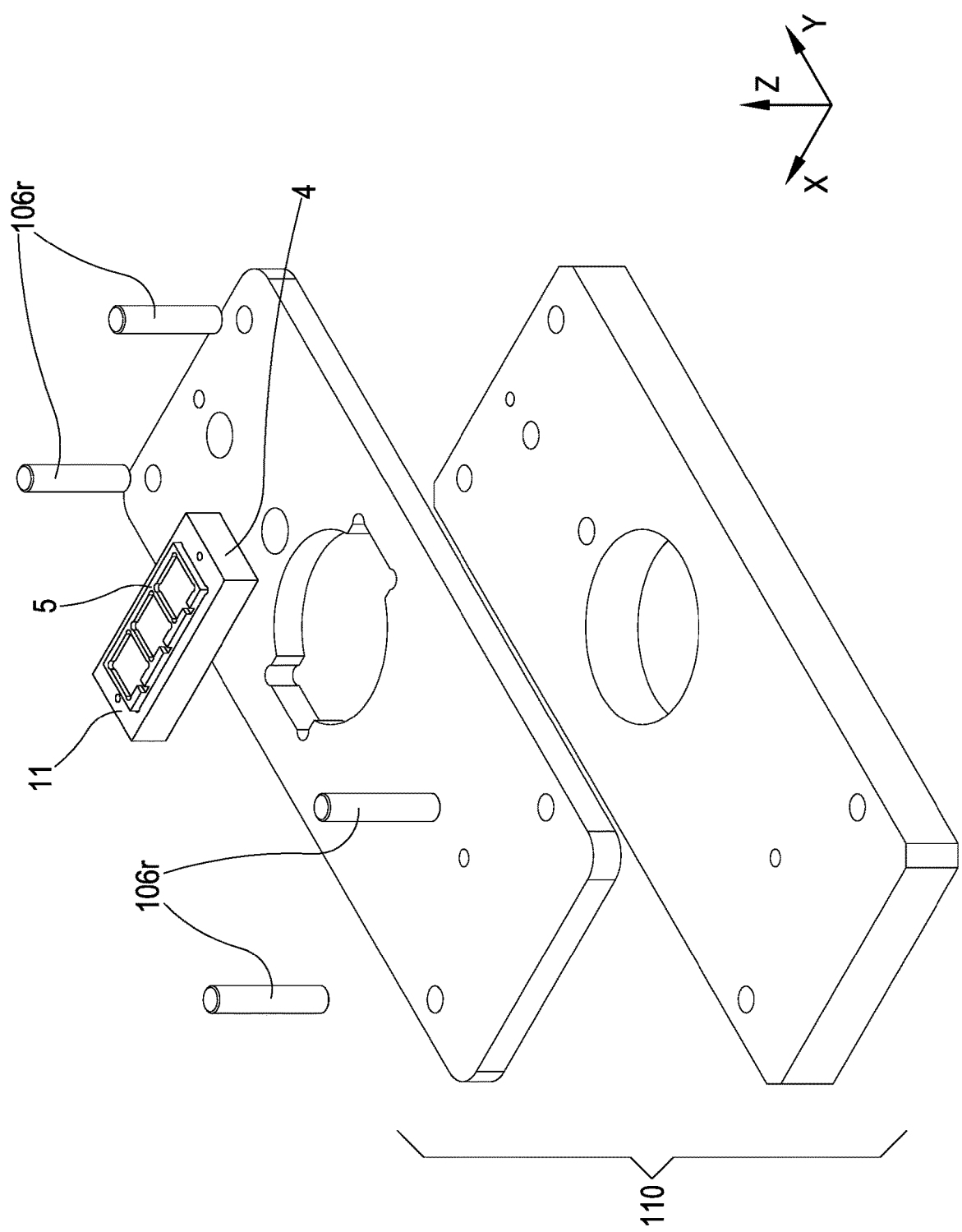
FIG. 5 is a perspective view of a support applicable to the press and intended to receive a template in accordance with the disclosure.
Figure 6:
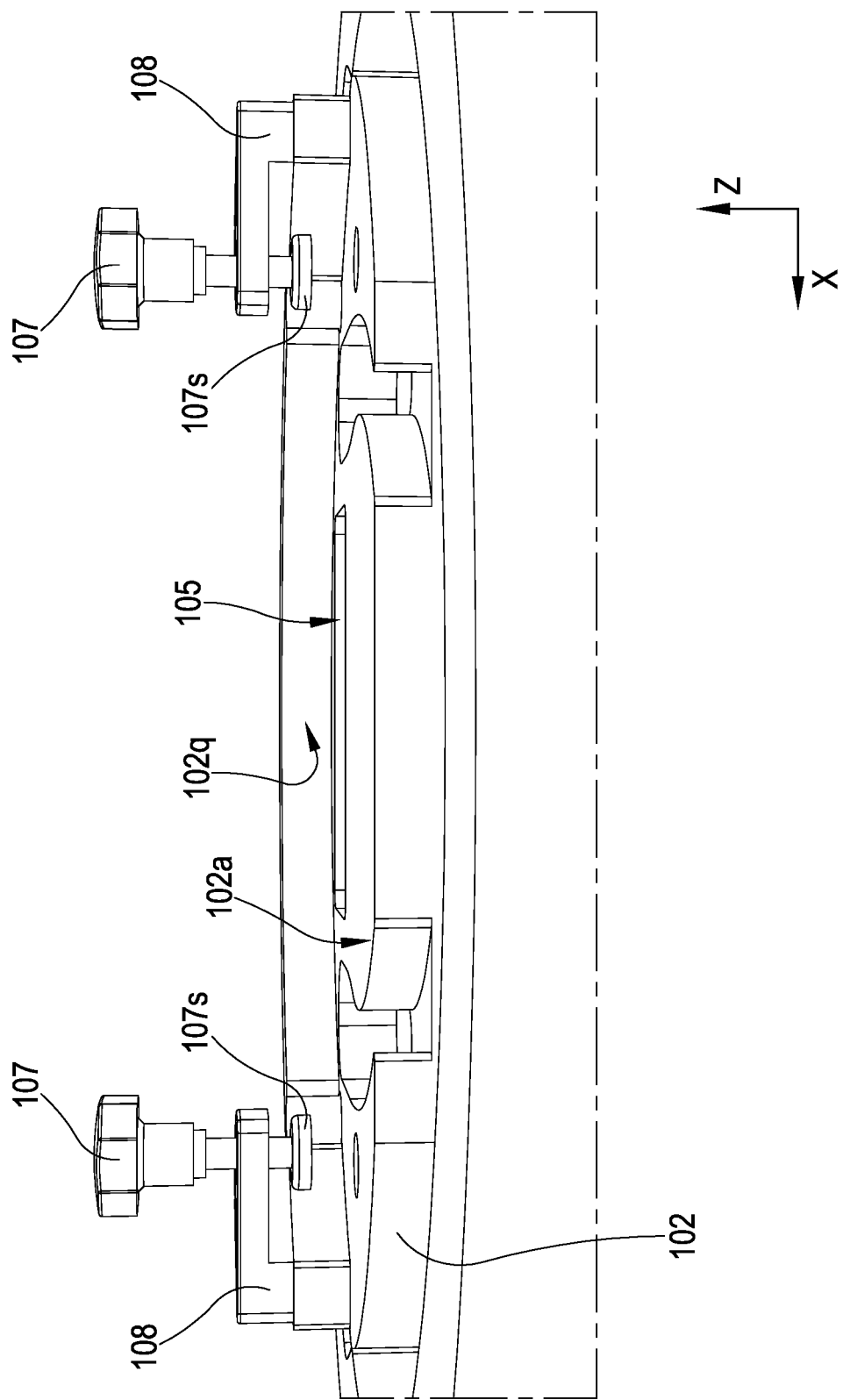
FIG. 6 is a front perspective view of the template in accordance with the second embodiment, observed with suitable enlargement to highlight a part thereof.
Figure 7:
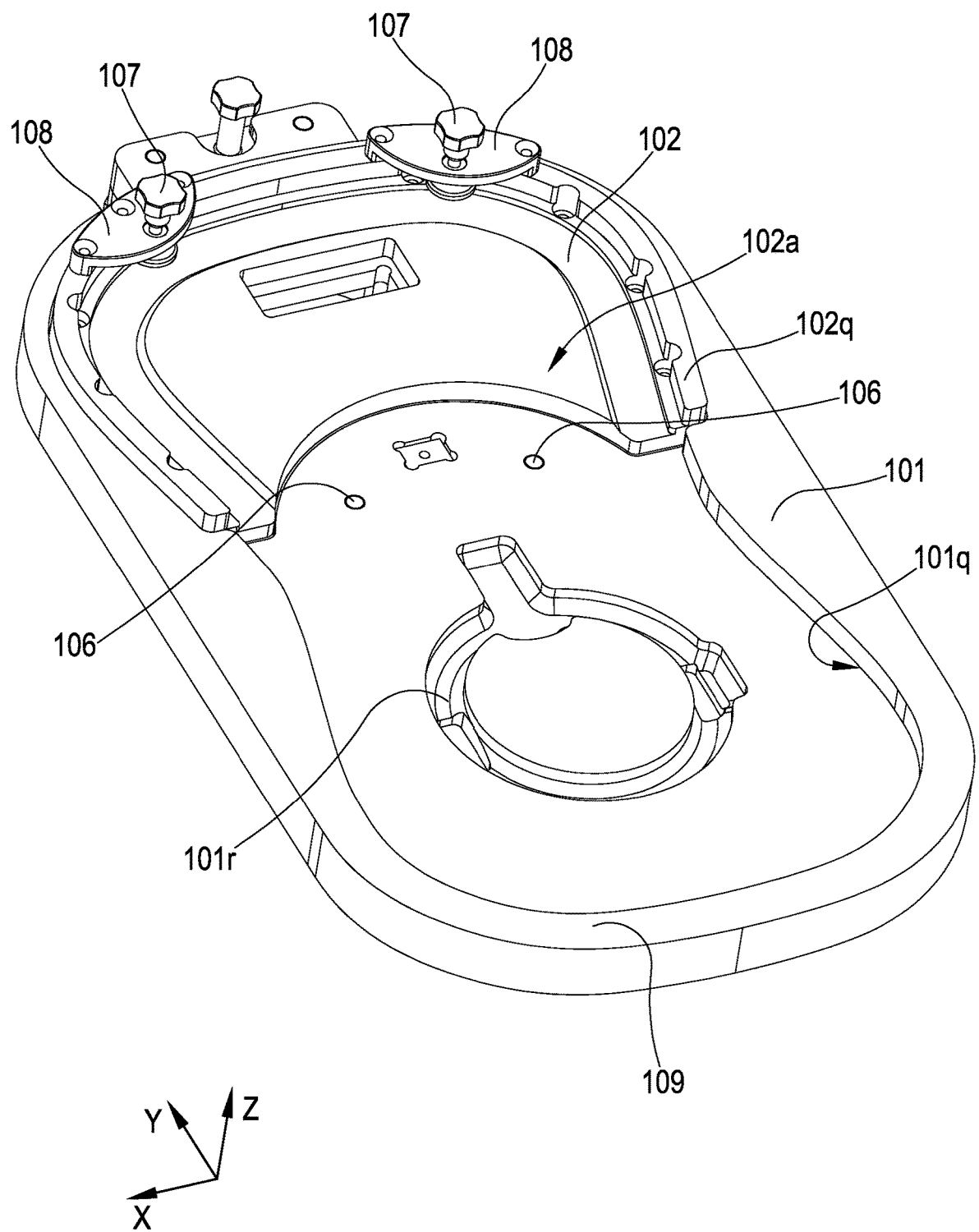
FIG. 7 is an additional perspective view of the template in accordance with the first embodiment.
Figure 8:
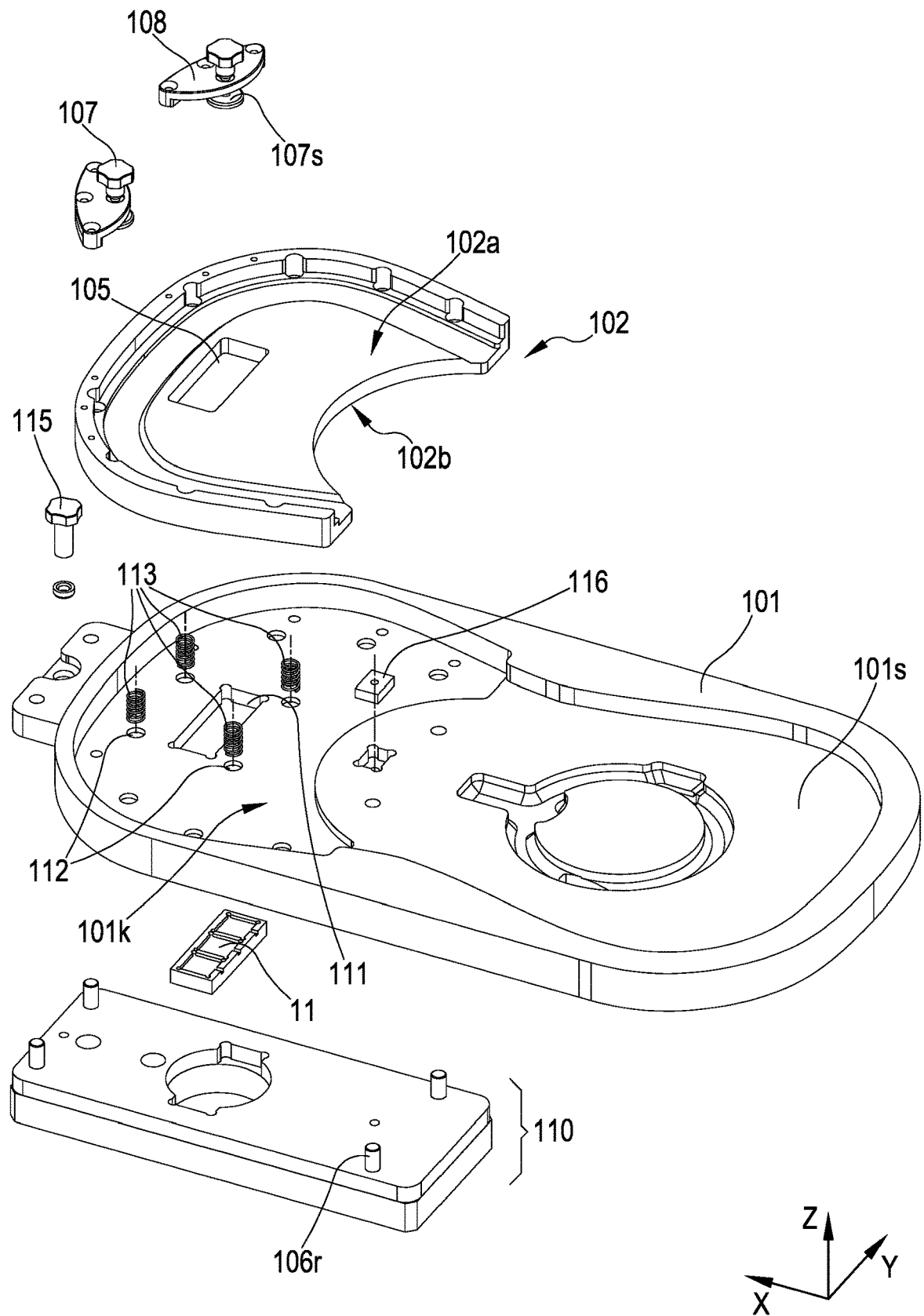
FIG. 8 is an exploded perspective view of the template in accordance with the first embodiment.
Figure 9:
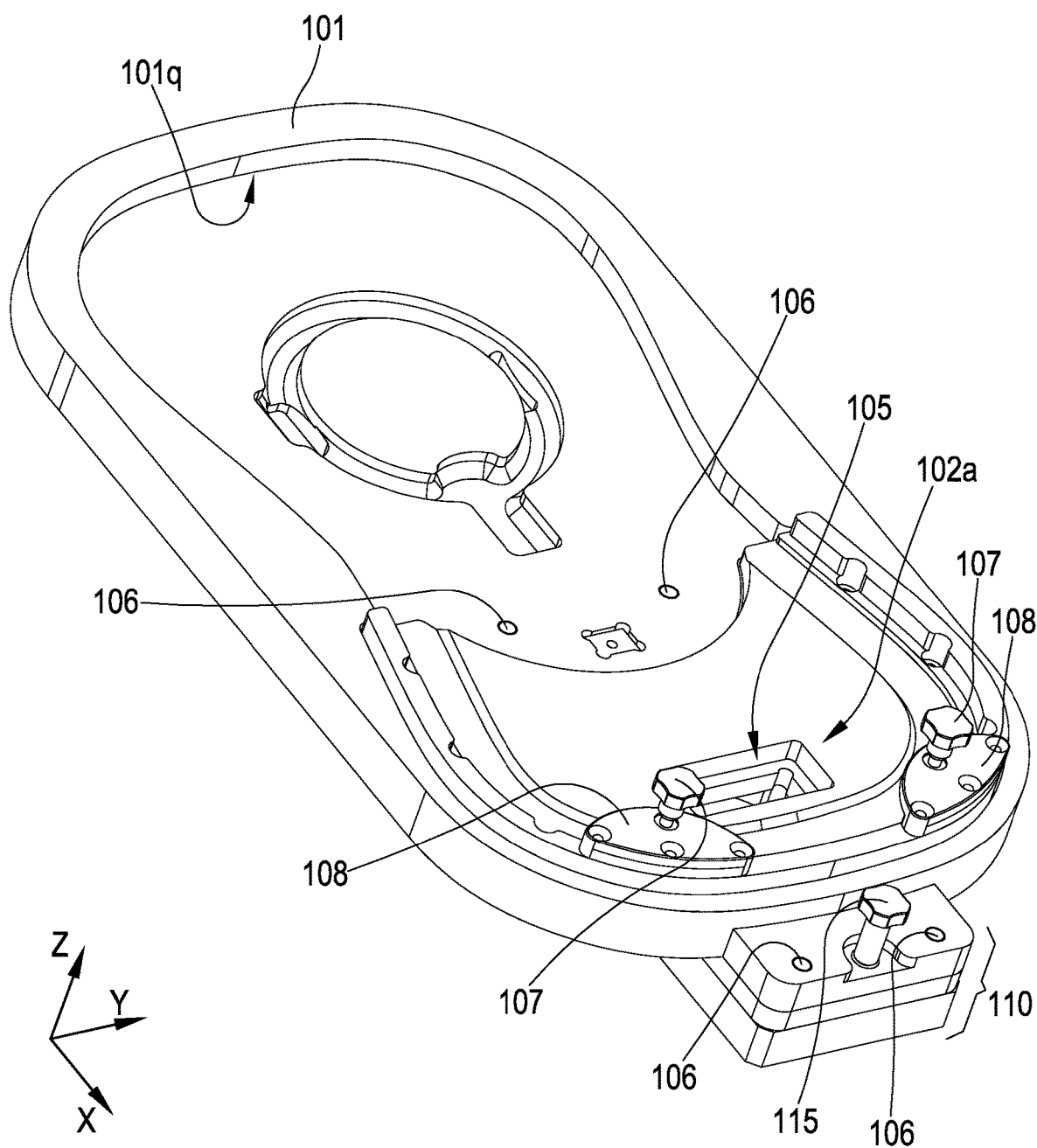
FIG. 9 is a perspective view of the template in accordance with the first embodiment.

On the base 3a (or on an additional element 110) is in detail installed a centering template 100 adapted to cooperate with a device for applying inserts 11 on laminar portions 103 of accessories 104 (for example, but without limitation, the accessory 104 in the shape of a bag, schematically represented in FIG. 1). The present detailed description refers to two preferred and non-limiting embodiments for the template 100, which differ mainly—but not only— because of the different shape of laminar portions 103 that they are configured to house. The first embodiment, in detail, is conceived to house a laminar portion of accessory with substantially "guitar body" shape, while the second embodiment is conceived to house a laminar portion of accessory with substantially circular shape. Although the two embodiments are associated with laminar portions whose outer perimeter is substantially free of angular points, this must not be interpreted as a limitation, even an implicit one. In practice, the two embodiments shown are intended for the use of inserts on two different types of bags with different shapes. The front region, where the device for applying inserts operates, typically receives the handbag closing flap (the laminar flap that closes the bag), while the rear portion receives the bag body. The various seats and configurations represented in the two embodiments take into account the different geometry of the handbags and of their inserts or elements such as handles, buckles, chains and additional inserts. As shown in FIG. 1 in detail the template 100 comprises a main body 101, which has a centering system 106 conceived so as to allow an engagement of the template 100 itself in a predetermined position on the base 3a. This predefined fastening allows to maintain a predetermined distance between the edge of the accessory and the point of application of the inserts, also maintaining the inserts aligned and in a position where there is no interference with other parts of the bag, such as the closing system. The main body 101 is installed on the base 3a through a separator element 110. In particular, in a preferred but non-limiting embodiment, the centering system 106 can comprise a plurality of hole 106-106r pivot assemblies, in which the main body 101 is for example holed while the separator element 110 has pins projecting therefrom to engage removably inside the holes 106 axially aligned thereto. This allows to obtain a fastening of the main support body 101 in a well determined and stable position with respect to the press 3. In more detail, the main support body 101 extends maximally along a plane identified by a pair formed by a first axis X and a second axis Y orthogonal to each other, in turn orthogonal to a third axis Z, which identifies in use a vertical axis along which the press 3 is moved, and in particular along which the movable element 3b (or slide) that moves towards and away from the base of the press to allow imparting an appropriate pressure to the interposed elements and to allow the coupling of inserts and of respective counter plates. The Applicant has also conceived screw locking elements 115, 116, for example opposite, respectively positioned in the front portion of the template 100 and placed in a substantially central position, in particular transversely central, of the main support body 101. The screw locking elements 115, 116 are configured to removably fasten the separator element 110 with the main support body 101 to prevent an involuntary movement thereof. More in detail every screw locking element comprises for example a control knob rigidly fastened to a threaded body that extends in substantially parallel direction to the third axis Z and engages in rotation on a counter-thread respectively positioned either on the separator element 110 or on the main support body 101. The main support body 101, as shown in particular in FIG. 1 (for the first embodiment) and in FIG. 4 (for the second embodiment), comprises an upper surface 101s and a lower surface; the upper surface 101s is for example, but without limitation, delimited by a perimetric edge 109 that defines an undercut 101g that surrounds the perimeter defining a wall substantially orthogonal thereto and within which in use is enclosed at least a part and for example the rear portion of the accessory (for example the bag body). In other words, said undercut identifies a profile retracing a first part of the perimeter of the accessory 104. The main support body 101 is also coupled to a centering element 102 that is configured to receive in pre-fixed position at least the laminar portion 103 of the accessory 104 (for example the closing flap). For example, but without limitation, the perimetric edge 109 defines a closed geometry, for example but without limitation a curve; the centering element 102 is contained inside the perimetric edge 109, so as to optimize the precision of the respective mechanical coupling. The function of the perimetric edge 109 is thus not only that of identifying a profile retracing a part of the perimeter of the laminar portion 103, in order to contain in use the possibilities of involuntary and harmful movement, but also that of providing a sliding guide for the centering element 102 between the working position and the resting position. For this reason the perimetric edge 109 operates synergistically on two fronts: the mechanical coupling between parts of the template 100 and an abutment for the laminar portion 103 during utilization of the template itself. For this reason, for example but without limitation, the perimetric edge 109 is joined with the upper surface of the main support body 101 with a vertical wall, i.e. oriented along a plane tangential to a plane comprising the first axis X and the third axis Z or a plane comprising the third axis Z and any axis lying on the plane X-Y. The centering element 102 is movable with respect to the main support body 101; in detail, the centering element 102 is movable between a resting position and a working position. The centering element 102 has an upper surface 102a and a corresponding lower surface 102b opposite to the upper surface 102a. This upper surface 102a and this lower surface 102b are for example positioned on a plane parallel to the first axis X and to the second axis Y, and in particular the upper surface 102a has a main extension plane. The centering element 102 therefore provides at least partial support for at least one laminar portion 103 through the upper surface 102a, removably holding in the predetermined position the at least one laminar portion 103 of accessory 104, confining its movement with respect to the main extension plane and/or with respect to the upper surface 102a. To optimize the holding of the laminar portion 103, the centering element 103 also has an undercut identifying a profile retracing a first part of the perimeter of the laminar portion 103 of the accessory 104. Overall, therefore, the undercut 101q of the main support body and the undercut of the centering element allow to enclose respectively a first part of the perimeter of the accessory and a second part of the perimeter of the accessory that for example totally delimit the mobility of the aforesaid laminar portion 103 along the plane identified by the first and second axis X, Y. More in detail, the resting position is an extracted position in which the upper surface 102a of the centering element 102 is moved away from the main support body 101, and in which—equally—the lower surface 102b of the centering element 102 does not touch the upper surface 101s of the main support body. The working position is a position in which the upper surface 102a of the centering element 102 is approached to the main support body 101 and more for example it is an end stop position, in which the lower surface 102b of the centering element 102 comes in contact with the upper surface 101s of the main support body. Therefore, the movement of the centering element 102 with respect to the main support body 101 takes place mainly by linear translation, in particular along a direction substantially parallel to the one identified by the third axis X. Moreover, the upper surface of the main support body 101 defines a recess 101k substantially counter-shaped to the centering element 102 to receive this element, specifically in the working position. Optionally but without limitation, to assure that the resting position is the one actually held by the centering element 102 in resting conditions, springs 113 positioned between the main support body 101 and a lower surface of the centering element 102 exercise a thrust action between these two elements, developing a force directed along the direction parallel to the third axis Z, that increases as the centering element 102 is pushed towards the main support body. To best hold the springs 113, appropriate seats or housings can be obtained in the main support body 101. Each of these housings, which for example are blind, is thus shaped to receive an extreme portion of a respective spring 113. Conveniently, to optimize the maintenance of the springs 113 in position, the lower surface 102b of the centering element 102 has a corresponding number of housings to receive the opposite extreme portion of the spring 113. In the example shown, the number of springs 113 present in the template 100 is even, and these springs are arranged symmetrically with respect to a median axis of the template 100, parallel to the axis Y or coinciding therewith. Incidentally, the Applicant points out that the template 100 can have symmetrical or non-symmetrical shape, based on the geometric agreement with the shape of the laminar portion to be worked. The springs 113 can be helical springs, whose development also takes place along a substantially parallel direction to the one identified by the third axis Z. However, this configuration should not be understood to be limiting, because the springs 113 can be equivalently replaced by equivalent linear actuators/elastic elements. On the centering element 102 is defined a containment portion 102q emerging away from the upper surface 102 and defining an undercut identifying a profile retracing a part of the perimeter of the laminar portion 103 of the accessory 104. In detail, as can be observed in the accompanying figures, both in the first and in the second embodiment of the template 100, the containment portion 102q is defined at a perimetric region of the centering element 102, and more in particular it defines a continuous perimetric edge extending exclusively in a front region of the centering element 102 itself. Optionally, said perimetric edge identifies an orthogonal wall with respect to the plane substantially identified by the upper surface 102a of the centering element. The undercuts defined on the centering element 102 and on the main support body 101 delineate and in particular surround the perimeter of the laminar portion of the accessory 104, so as to contain its movement and optimize the repeatability of the positioning of the characters on the laminar portion 103. The Applicant has observed in particular that the introduction in use of the laminar portion 103 of the accessory 104 on the template 100 follows a direction that substantially concurs with the direction identified by the axis Y, in particular following an introduction that from the rear part of the template moves towards the front part where the centering element 102 is present, more proximal to the press 3. The perimetric edge, in particular when it defines the aforesaid orthogonal wall, offers an abutment means particularly congenial to define the correct alignment of the laminar portion 103 on the template along the direction identified by the second axis Y, preventing in particular a positioning excessively advanced along the aforesaid second axis Y. The centering element 102 also has a seat 105 that for example but without limitation, as in the case of the embodiments illustrated in the accompanying figures, is in the form of through hole with closed profile. The seat 105 is conceived for the inserts 11, in particular to house in its interior the inserts 11 and it has a substantially polygonal shape that in the accompanying figures is rectangular. The shape of the seat 105 is equal to the shape of the support for the inserts 11, in particular its dimensions are such as to minimize play with the support of the inserts 11, so as to optimize the coupling precision and to allow a very reliable reproducibility of the application of the inserts 11 on laminar portions 103 of distinct accessories 104. In the preferred embodiments illustrated in the accompanying figures, the seat 105 opens on a through hole present in the main support body 101, which is axially aligned to the seat 105, and in particular it is aligned thereto along an axis parallel to the axis Z or coinciding therewith. This through hole is indicated in the accompanying figures with the reference number 111 and it represents an auxiliary seat. In particular, because of the specific configuration of the templates described herein, the alignment between the auxiliary seat 111 aid the seat 105 is maintained in every position between the resting position and the working position. Without limitation, the auxiliary seat 111 has a substantially closed polygonal profile whose edges have recesses with circumference arc section XY, inscribed in a polygon of greater size with respect to the polygon differently identifying the main part of the profile of the auxiliary seat 111 itself. This facilitates the extraction and introduction of the support for the inserts 11 in the seat itself, for example and without limitation allowing the introduction of a finger. In addition, the through hole present in the main support body extends opens in axial alignment on a bottom seat obtained in the separator element 110; said bottom seat, like the seat 105, can have at least partially equal shape to the profile identified by the outer perimeter of the inserts 11. In use, these inserts 11 are made to bear on the separator element 110 at the bottom seat; the hole present in the main support body 101 and the seat 105 of the centering element allow the upper part of the supports 11 to face from the centering element 102 and to have linear sliding relative thereto during the movement of the latter centering element 102 with respect to the main support body 101 between the resting position and the working position. The main support body 101 and the centering body 102 comprise respective through holes 111f aligned along the third axis (Z)—for example indicated in FIG. 1—to assure the precision of their respective and/or mutual coupling, especially in the peripheral portions. In more detail, the main support body 101 and the centering body 102 are coupled together to maintain the alignment of the through holes both in the working position, and in the resting position of the centering body 102. Moreover, the template comprises an end stop element for each pair of through holes 111f (for example a two-headed through pin), and the end stop elements define the resting position of the centering body 102 preventing further removal (or disengagement) of the centering element 102 from the main support body 101. The centering element 102 also comprises at least one fastening tab 108, which is positioned at a predefined elevation with respect to the upper surface 102a of the centering element 102, in particular being installed so that it, too, is provided with faces positioned on planes identifying directions parallel to the first and second axis X, Y, being in other words parallel to the upper surface 102a of the centering element. In particular, in the preferred and non-limiting embodiments illustrated in the accompanying figures, there are two fastening tabs 108, arranged symmetrically with respect to a centerline of the centering element. The fastening tab 108, and in the preferred embodiment, the two fastening tabs 108, partially overlap the upper surface 102a of the centering element 102, projecting cantilevered from the containment portion 102q identifying at least a gap—two if two fastening tabs 108 are present—configured to limit the mobility of the laminar portion 103 of accessory 104 along a direction parallel to the third axis Z. If two fastening tabs 108 are also present, the retaining of the laminar accessory portion 103 is also optimized transversely with respect to the direction identified by the first and second axis X, Y, in particular in the front portion of the template where the seat 105, the most critical one for the correct positioning of the characters, is present. The present of the two fastening tabs is particularly important or useful if the laminar portion 103 has significant size. Regardless of the number of fastening tabs 108 actually installed on the centering element 102, as shown with detail in FIG. 6, each fastening tab is thus rigidly engaged to the centering element 102 for example in a removable manner and in particular by removing fastening screws that join each fastening tab with the containment portion 102q of the centering element 102. Each fastening tab 108 has a movable thruster 107, in particular movable along a direction substantially parallel to the third axis Z. The thruster 107 has at least a first configuration of minimum distance with respect to the upper surface 102a of the centering element 102 and a second configuration of maximum distance with respect to the upper surface 102a of the centering element. In more detail, every thruster 107 has an at least partially threaded body configured to be engaged in relative rotation around an axis parallel to the third axis Z with respect to its own fastening tab 106, being therefore able to slide along said third axis Z with seamlessly adjustable distance, thus in a plurality of intermediate positions between the aforesaid first and second position. Every thruster 107 has a first and a second end, respectively upper and lower; the first end of each thruster 107 has a control knob, able to be actuated by the user's hand by a rotation alternatively clockwise or counterclockwise; the second end, opposite to the first end of each thruster 107, has a contrasting disk 107s, with greater diameter than the body of the thruster itself, for example but without limitation rotating idly with respect thereto. The Applicant has noted that the possibility of adjusting the position of the thrusters 107, and thus of the contrasting disk 107s, in a plurality of intermediate positions between the first and the second position allows to block laminar portions 103 even with significantly different thicknesses, very thickness or on the contrary very think, thereby assuring high operating flexibility for the template. Incidentally, use of an idle contrasting disk 107 with respect to the rotation of the body of the thruster is such that in the locking the rotation of the body of the thruster 107 relative to its own fastening tab does not translate into a movement of the contrasting disk. This prevents inappropriate markings on the laminar portion 103, and therefore makes the template particularly suited to be used also on laminar portions 103 of accessories 104 of particular delicacy and/or value. The thrusters 107, like the fastening tabs 108, move integrally with the centering element 102 in the linear translation between the resting position and the working position. While this configuration should not be considered limiting, the upper surface 101s of the main support body 101 can comprise a recess 101r able to host particular accessories or details already fixed or otherwise joined or on to the laminar portion 103. The shape of the recess 101r should not be considered limiting. To allow an easy and economical work process, at least the main support body 101 and the centering element 102 can be made of wood, for example of MDF. This enables the manufacturer of the template 100 to manufacture a great variety of shapes in accordance with the specific profile of each laminar portion 103 by easy machining from a solid block for example by numerically controlled milling machine. However, the Applicant has observed that the laminar portions 103 are often laminar portions of parts of accessories—both women's and men's—whose cost is significant. To minimize the risk of marking parts of the laminar portion 103 not involved with the application of the inserts 11, the Applicant has advantageously coated at least the upper surfaces 102s, 101s and for example the centering element 102 and the main support body 101 made of soft material, for example and without limitation leather and/or suede. In use, the method for applying inserts 11 on the laminar portion 103, follows the steps described herein. The method first of all comprises a step of defining which composition of letters and/or alphanumeric characters to apply on the laminar portion 103, followed by an installation thereof on the inserts 11. The Applicant points out that, with respect to the traditional reading order, this definition must take into account (in most cases, but not always) the reverse direction of reading with respect to the application. In other words, in the course of the customization operation, the decision is made (for example by the customer) how many and which inserts 11 to apply to the laminar portion 103. The housing portion 5 having the necessary number of seats 6 (for example 2 to place initials on the product) is then engaged in the support portion 4. The selected corresponding auxiliary housing portion 9 is then applied (for example with the same number of seats for the counter-plates). The retaining elements 12 bearing the desired inserts are then positioned in the seats 6 and the corresponding counter-plates in the auxiliary seats 10. Following this defining step, the main support body 101 is installed on the spacer element fastened thereto by at least the hole-pivot assembly 106, 106r and more in particular also by means of the screw locking elements 115, 116. The inserts 11 are introduced at the housing portion 5 which is first positioned at the main support body 101 in the hole intended thereto. In more detail, as shown for example in FIG. 8, the housing portion is installed in the auxiliary seat 111 whose shape is corresponding thereto and/or to the support portion 4. At this point, the housing portion 5 of the inserts 11 is substantially aligned to the main support body 101, in particular introduced in its auxiliary seat 111 axially aligned with the seat 105 of the centering element, and it is surrounded by the seats or housings 112 for the springs 113 represented in FIG. 8. Since the centering element 102 is mounted on the main support body 101, bearing on the springs 113 and held by the fastening pins, the seat 105 too is perfectly aligned with the inserts. After the laminar portion was correctly positioned on the centering element 102, the press 3 is ready to be actuated. To apply the inserts 11, the laminar portion 103 is positioned on the press 3 by means of the centering template as described in accordance with the above description. The laminar portion 103 is arranged or equivalently positioned at least on the upper surface 102a of the centering element 102, and the remaining part of the accessory 104 is on the upper surface 101s of the main support body 101 so as to be held by the undercuts 101q and 102q respectively of the main support body 101 and of the centering element 102 and the relative movement thereto along the directions identified by the first axis X and by the second axis Y is prevented. To assure a locking of the laminar portion 103 also along a direction identified by the third axis Z, before actuating the press 3 the user optionally, but for example, can actuate the thrusters 107 rotating them appropriately with a rotation relative to the third axis Z that because of the thread of their body causes a complex roto-translation motion to lower the elevation of the contrasting disk 107s until reaching contact with the laminar position. Subsequently, the relative movement of the first support 2 of the press 3 is carried out with respect to the second support 7 of the press 3. Following said movement, the inserts 11 are transferred from the housing seat 13 of the plurality of retaining elements 12 to the laminar portion. More in particular, by means of the relative motion between the first support 2 of the press 3 and the second support 7 of the press 3, the centering element 102 is moved with respect to the main support body 101 between the extracted resting position in which the upper surface 102a of the centering element 102 is moved away from the main support body 101 and the working position in which the upper surface 102a of the centering element 102 is approached to the main support body 101. When the inserts 11 have been transferred on the laminar portion 103, the first and the second support 2, 7 of the press 3 are linearly removed from each other. At this point the user can again actuate in rotation the thrusters 107 to cause to contrasting disk 107s to move away from the laminar portion. The Applicant lastly observes that the actuation of movable parts of the template and/or of the device 1 described previously, as well as the execution of at least parts of the method described previously can be carried out by means of an automated and/or remote control through servo actuators, whose actuation is commanded or overseen by a software program, loaded on a non-transitory memory support, for example by a data processing unit. The data processing unit can be a general purpose processor specifically configured through said software program or firmware to execute one or more parts of the method identified in the present disclosure, or it can be an ASIC or dedicated processor, specifically programmed to execute at least part of the operations of the method or process of the present disclosure. For this reason, pursuant to the present disclosure, the template 100, or the device 1, in accordance with a particular embodiment, can comprise said data processing unit and/or said non-transitory memory support. Lastly, it is clear that to the template and to the methods described previously can be applied additions or variants that are obvious for a person skilled in the art, without thereby departing from the scope of protection provided by the accompanying claims. The object of the disclosure is not limited to the embodiments illustrated in the drawings. Therefore, it should be understood that when the features mentioned in the claims are followed by reference numbers or reference signs, such numbers or signs are included solely for the purpose of increasing the intelligibility of the claims and do not limit, in any way, the scope of protection of the claims.

The invention claimed is:

1. A device for applying inserts on laminar supports, comprising:
   a first support for a press having a fastening portion configured to engage rigidly to a base of the press and a housing portion having a predetermined number of seats;
   a second support for a press having a respective auxiliary fastening portion configured to engage to an element of the press and an auxiliary housing portion having a predetermined number of auxiliary seats, the first and the second support being relatively movable towards/away along a direction of displacement;
   one or more inserts to be applied to the laminar supports;
   at least one retaining element having an outer profile configured to be housed in a respective seat of the housing portion of the first support and coupled to said one or more inserts;
   a predetermined number of fastening elements associable to said predetermined number of auxiliary seats of the housing portion of the second support and configured to be fastened in use to said one or more inserts;
   a centering template for devices for applying inserts on the laminar supports, wherein the centering template has:
      a main support body having a centering system to allow an engagement of the template in pre-fixed position to a base of the press;
      a centering element configured to receive in pre-fixed position at least one laminar portion of an accessory, said centering element having a seat for the inserts,
   wherein the centering element is movable with respect to the main support body between an extracted resting position in which an upper surface of the centering element is moved away from the main support body and a working position in which the upper surface of the centering element is approached to the main support body, and in which the seat for the inserts houses in use said first support, and the centering element, in a passage between the extracted resting position and the working position, slides with respect to the first support.

2. Device according to claim 1, wherein the centering element provides at least a partial support for the at least one laminar portion through the upper surface which develops on a main extension plane; said centering element being, moreover, configured to retain removably in the pre-fixed position said at least one laminar portion of the accessory, confining its movement with respect to the main extension plane and/or with respect to the upper surface.

3. Device according to claim 1, wherein the upper surface of the centering element identifies at least one planar subportion comprising a first axis and a second axis orthogonal to the first axis, and wherein the centering element slides linearly between the extracted resting position and the working position along a direction substantially parallel to a third axis orthogonal to the first and to the second axis and wherein the template comprises a plurality of elastic elements interposed between the centering element and said main support body, wherein the elastic elements are configured to push the centering element in the extracted resting position and to exercise a force contrasting movement of the centering element from the extracted resting position to the working position.

4. Device according to claim 3, wherein the plurality of elastic elements is aligned along an orthogonal direction with respect to the first axis and to the second axis.

5. Device according to claim 3, wherein the main support body has a surface facing the centering element having a predetermined number of housings to receive an extreme portion of a respective elastic element, a lower surface of the centering element having a corresponding number of housings to receive the opposite extreme portion of the respective elastic element, said housings of the main support and of the centering element being blind housings.

6. Device according to claim 1, wherein the centering element comprises a containment portion emerging away from the upper surface and defining an undercut identifying a profile retracing a second part of a perimeter of the laminar portion of the accessory and wherein the containment portion is defined at a perimetric region of the centering element.

7. Device according to claim 6, wherein the containment portion defines a substantially continuous perimetric edge extending exclusively in a front region of the centering element and identifies a wall substantially orthogonal with respect to the upper surface.

8. Device according to claim 1, wherein the main support body comprises a perimetric edge or containment portion defining an undercut, identifying a profile retracing a first part of a perimeter of the laminar portion of the accessory.

9. Device according to claim 8, wherein the centering element is substantially housed in the main support body at a front region of the main support body, the perimetric edge defining a sliding guide for the centering element between the working position and the extracted resting position.

10. Device according to claim 9, wherein the centering element comprises a containment portion emerging away from the upper surface and defining an undercut identifying a profile retracing a second part of a perimeter of the laminar portion of the accessory and wherein the containment portion is defined at a perimetric region of the centering element, and wherein the containment portion of the centering element develops at the perimetric edge of the main support body, the perimetric edge and the containment portion defining respective mutual sliding guides for the centering element between the working position and the extracted resting position.

11. Device according to claim 1, wherein the seat is a through seat with closed profile and wherein the main support body comprises an auxiliary seat for the inserts, the seat of the centering element and the auxiliary seat being aligned along a third axis, the alignment being maintained both in the working position, and in the extracted resting position of the centering element.

12. Device according to claim 11, wherein the through seats has substantially polygonal shape.

13. Device according to claim 1, wherein in the working position of the centering element a lower surface of the centering element abuts on an upper surface of the main support body, and wherein the main support body and the centering body comprise respective through holes aligned along a third axis, the main support body and the centering element being mutually coupled to maintain the alignment of the through holes both in the working position, and in the extracted resting position of the centering extracted, the template further comprising an end stop element for each pair of through holes, the end stop elements defining the extracted resting position of the centering element preventing further removal of the upper surface of the centering element from the main support body.

14. Device according to claim 1, wherein the centering template is substantially symmetric with respect to a second median axis in the main plane of development of the template and wherein the main support body comprises a recess substantially counter-shaped to the centering element to receive the centering element in the working position.

15. Device according to claim 1, wherein the main support body comprises a perimetric edge defining an undercut, the perimetric edge identifying a profile retracing a second part of the perimeter of the laminar portion in a rear portion of the main support body.

16. Device according to claim 1, wherein the centering element comprises at least one fastening tab, positioned at a predefined elevation with respect to the upper surface of the centering element, at least partially overlapping the upper surface identifying with the upper surface a gap configured to limit mobility of the laminar portion of accessory, the fastening tab having a thruster, movable along a direction substantially parallel to a third axis, wherein the thruster comprises at least a first configuration of minimum distance with respect to the upper surface of the centering element and a second configuration of maximum distance with respect to the upper surface of the centering element, the thruster being able to be placed in a plurality of intermediate blocking positions between the minimum and the maximum distance to block the laminar portion.

17. Device according to claim 1, wherein the main support body and/or the centering element are at least partially coated superiorly with a soft finishing material.

18. Device according to claim 1, further comprising a separator element configured to bear on the base of the press, wherein the main support body is installable on the separator element and wherein the centering system comprises holes or pins, obtained on the main support body, the separator element having respective pins or holes for coupling to the centering system of the main support body.

19. Device according to claim 18, wherein the separator element has a seat for receiving and housing at least partially the fastening portion.

20. Device according to the claim 1, comprising a plurality of inserts and a plurality of retaining elements, each having an outer profile configured to be housed in a respective seat of the housing portion of the first support and a respective housing seat to receive removably one of said inserts, and wherein the housing portion has a plurality of seats.

* * * * *